United States Patent [19]
Hall et al.

[11] Patent Number: 5,680,770
[45] Date of Patent: Oct. 28, 1997

[54] PIPE FREEZING APPARATUS

[75] Inventors: Richard M. Hall, Hockessin; Kevin C. Gilbert, Newark, both of Del.

[73] Assignee: Freeze Service, Inc., Wilmington, Del.

[21] Appl. No.: 743,560

[22] Filed: Nov. 4, 1996

[51] Int. Cl.⁶ .................................................. F25C 1/00
[52] U.S. Cl. ........................ 62/293; 165/169; 138/97; 285/15
[58] Field of Search ........................... 62/293; 165/169; 285/15, 419; 138/97, 99

[56] References Cited

U.S. PATENT DOCUMENTS

| | | | |
|---|---|---|---|
| 2,572,555 | 10/1951 | Young et al. | 62/293 |
| 3,498,071 | 3/1970 | Tremont | 62/293 |
| 3,559,423 | 2/1971 | Scheidler | 62/293 |
| 3,623,337 | 11/1971 | Tremont | 62/293 |
| 3,742,723 | 7/1973 | Grise' | 62/293 |
| 3,827,282 | 8/1974 | Brister | 138/97 |
| 3,901,269 | 8/1975 | Henderson | 165/169 |
| 3,926,006 | 12/1975 | Brooks et al. | 62/66 |
| 4,112,706 | 9/1978 | Brister | 62/293 |
| 4,220,012 | 9/1980 | Brister | 62/130 |
| 4,267,699 | 5/1981 | Bahrenburg | 62/66 |
| 4,309,875 | 1/1982 | Radichio | 62/66 |
| 4,370,862 | 2/1983 | Brister | 62/66 |
| 4,416,118 | 11/1983 | Brister | 62/66 |
| 4,433,556 | 2/1984 | Brady | 62/293 |
| 4,509,588 | 4/1985 | Parham | 165/169 |
| 4,729,425 | 3/1988 | Mitchell | 165/169 |
| 4,944,161 | 7/1990 | Van Der Sanden | 62/293 |
| 5,605,357 | 2/1997 | Bird | 285/15 |

*Primary Examiner*—William E. Tapolcai
*Attorney, Agent, or Firm*—Connolly & Hutz

[57] ABSTRACT

Apparatus for freezing liquid in a fluid conducting pipe comprises a freeze jacket having two halves for releasably surrounding a section of pipe. Each jacket half includes outwardly extending flanges in abutting relationship when the jacket halves surround the section of pipe, and structure is provided on the flanges for releasably securing the two jacket halves together around the pipe. The jacket has an internal cylindrical freeze cavity adjacent the pipe and this cavity receives and retains a supply of liquid nitrogen. The cylindrical freeze cavity is defined in part by an inner two-part fixedly secured cylindrical sleeve, one half of the sleeve being associated with each half of the jacket. Insulation is positioned on the outside of each fixed sleeve half between that sleeve and an outer removable cover. Removal of the cover enables internal structural repairs and exposes the insulation for removal and replacement with new insulation.

8 Claims, 2 Drawing Sheets

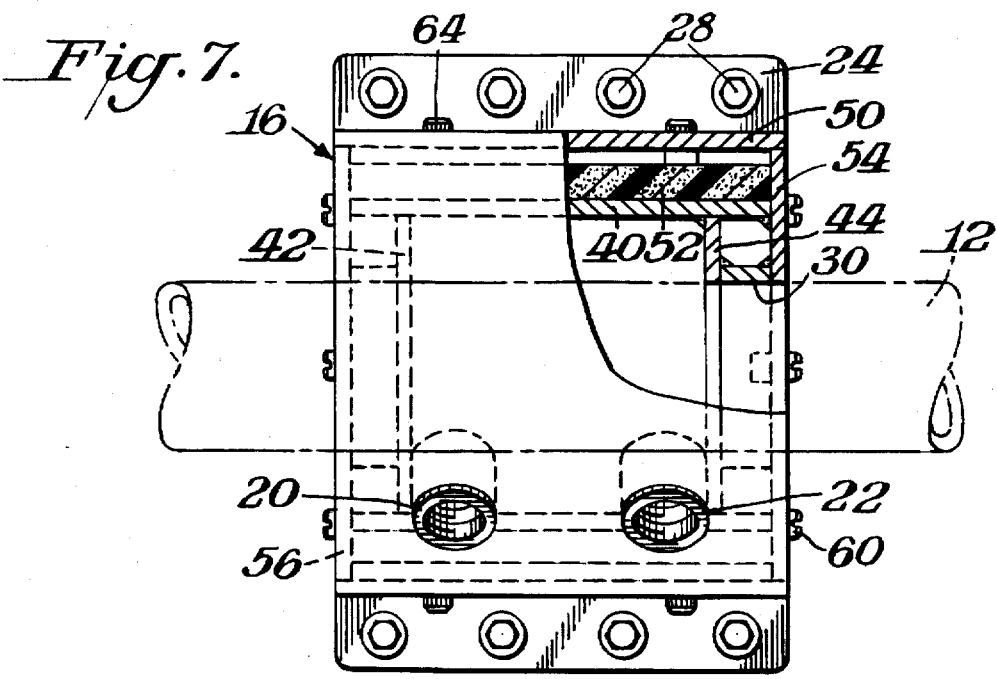
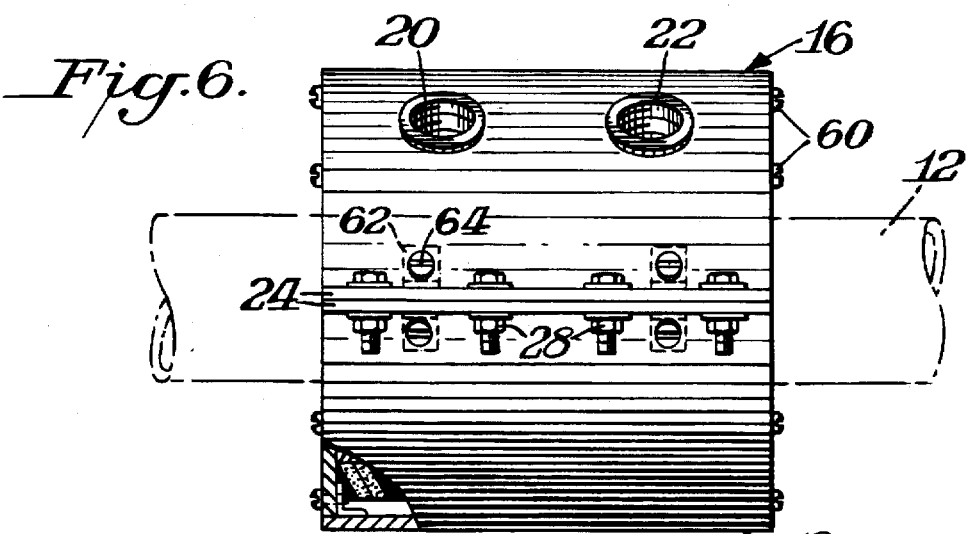
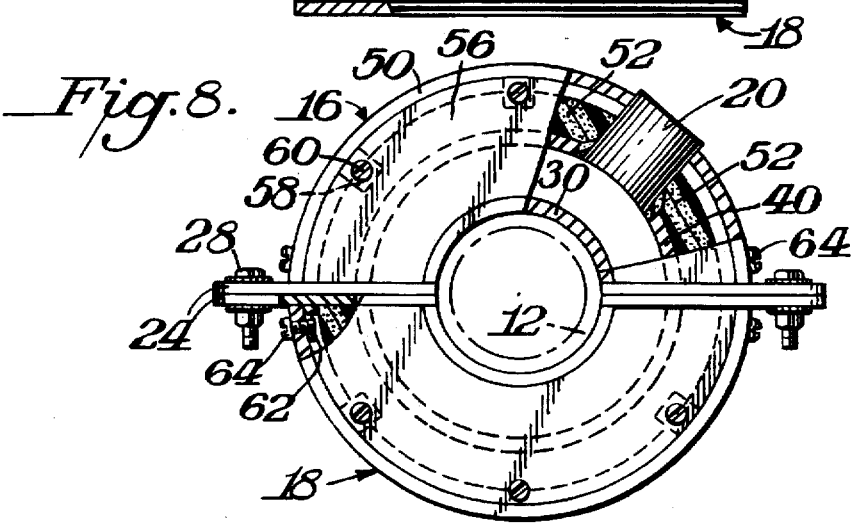

PIPE FREEZING APPARATUS

BACKGROUND OF THE INVENTION

The present invention relates to pipe freezing apparatus and more particularly to such apparatus including a removable pipe surrounding freeze jacket with replaceable insulation.

Over the years many devices have been proposed for freezing the liquid in a section of fluid conducting pipe to thereby produce a solid plug and thus enable disassembly for repair purposes without the need for total shutdown. In many instances a sleeve or jacket is positioned around the pipe and a refrigerant such as liquid nitrogen is poured into an internal freeze cavity in the jacket. Liquid in the pipe at the location of the jacket is frozen into a solid plug thereby blocking any further flow through the pipe. A section of pipe in need of repair may be isolated with pipe freezing devices positioned on opposite sides of the repair site. Solid plugs formed on each side of the repair site prevent liquid flow and enable the repairs to be performed such as removal and replacement of a faulty gate valve, for example.

Pipe freezing devices are also used in the service of nuclear power plants. Following these repairs all of the various equipment used in the repair process must be scanned or otherwise tested for contamination with radioactive particles before being released. While appropriate decontamination procedures often correct this problem, in many instances internally trapped fixed insulation on the outside of the internal freeze cavity of the jacket becomes contaminated with radioactive particles and appropriate decontamination is not possible. Under these circumstances, the pipe freezing apparatus is not released and any further use thereof is not possible.

Additionally, on various occasions pipe freezing devices may be in need of structural repairs. While in some cases external repairs may be performed, internal repair work is not possible.

SUMMARY OF THE INVENTION

Accordingly, it is an object of the present invention to provide pipe freezing apparatus with removable insulation which enables the insulation to be replaced.

Another object of the present invention is the provision of pipe freezing apparatus with a removable outer cover which enables internal structural repairs to be performed.

Another object of the invention is the provision of pipe freezing apparatus simple in construction, durable, and easy to use and repair in an efficient manner.

In accordance with the present invention, apparatus for freezing liquid in a fluid conducting pipe comprises a freeze jacket having two halves for releasably surrounding a section of pipe. Each jacket half has outwardly extending flanges in abutting relationship when the jacket halves surround the section of pipe, and fasteners on the flanges releasably secure the two jacket halves together around the pipe. The jacket has an internal cylindrical freeze cavity adjacent the pipe section surrounded by the jacket for receiving and retaining a supply of liquid nitrogen. The cylindrical freeze cavity is defined in part by a fixed two-part cylindrical sleeve with one half of the sleeve associated with each half of the jacket. Each jacket half has an outer removable cover outwardly spaced from the fixed sleeve, and insulation on each jacket half is positioned between the fixed sleeve and the outer removable cover. Fastening structure on each jacket half removably secures the outer cover in place whereby removal of the cover enables internal structural repairs to be made and exposes the insulation for removal and replacement with new insulation.

Preferably each jacket half has opposed semi-annular end walls positioned between the fixed sleeve and the removable outer cover and extending inwardly to the pipe section with the end walls fixedly secured to the outwardly extending flanges of each jacket half. The structure on each jacket half for removably securing the outer cover in place includes inwardly directed tabs on the cover positioned adjacent the fixedly secured semi-annular end walls and removable fasteners securing the end walls and tabs together.

The structure on each jacket half for removably securing the outer cover in place also includes upwardly directed tabs on the flanges positioned adjacent the removable cover and removable fasteners securing those tabs and the cover together.

The freeze jacket construction preferably includes an inlet pipe and a vent pipe on one of the jacket halves with both pipes extending between the internal freeze cavity and the exterior of the removable cover.

The freeze jacket construction of the present invention may be utilized with a variety of different pipe configurations and orientations. One jacket construction has a straight axis for surrounding straight pipe regardless of the orientation of that pipe. In this regard, the jacket may be used on horizontally or vertically disposed pipes, for example. Additionally, the jacket may have a curved configuration for surrounding a curved section of pipe such as an elbow.

BRIEF DESCRIPTION OF THE DRAWINGS

Novel features and advantages of the present invention in addition to those mentioned above will become apparent to persons skilled in the art from a reading of the following detailed description in conjunction with the accompanying drawings wherein similar reference characters refer to similar parts and in which:

FIG. 6 is an enlarged side elevational view of a freeze jacket releasably surrounding a horizontal pipe, according to the present invention;

FIG. 7 is a top plan view of the freeze jacket device shown in FIG. 6, and

FIG. 8 is a left end elevational view of the freeze jacket shown in FIGS. 6 and 7, with portions broken away to illustrate interior details.

DETAILED DESCRIPTION OF THE INVENTION

Figure 1:
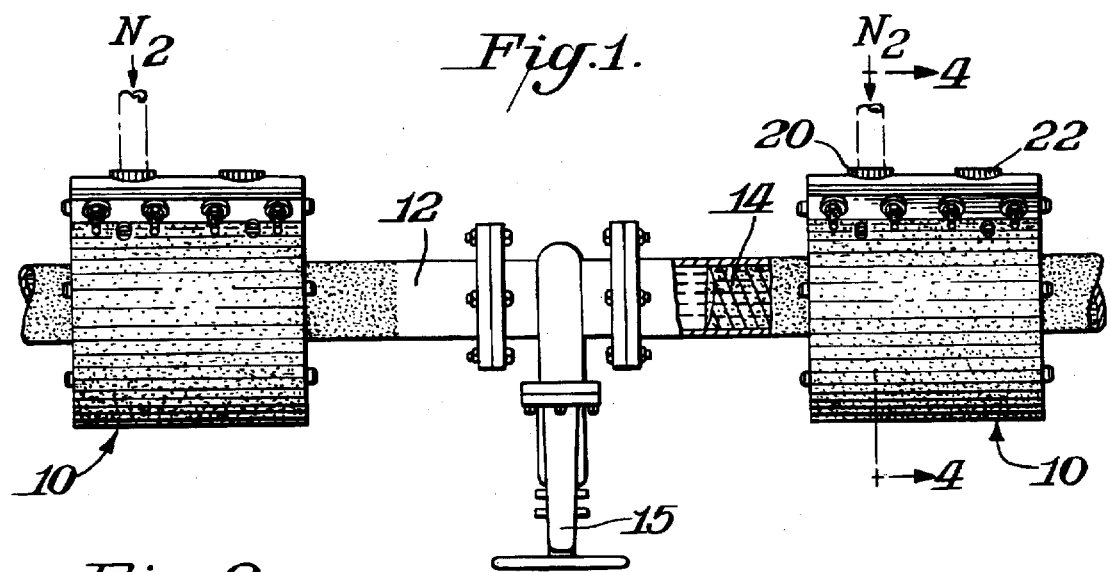
FIG. 1 is a side elevational view of two straight freeze jackets, according to the present invention, both jackets removably surrounding a horizontal pipe for repair and/or replacement of a deflective gate valve.

Referring in more particularity to the drawings, FIG. 1 illustrates apparatus for freezing liquid in a fluid conducting pipe, in accordance with the present invention. Specifically, a pair of freeze jackets 10 releasably surround a fluid conducting pipe 12 at predetermined locations along the pipe. Each freeze jacket is conducted and arranged to receive and retain a supply of liquid nitrogen for the purpose of freezing liquid in the pipe to thereby produce a solid plug 14 at each freeze jacket location. In this particular utilization of the pipe freezing apparatus, the section of pipe 12 between freeze jackets 10 is isolated in order to make repairs on a faulty gate valve 15.

Freeze jacket 10 of the present invention comprises two halves 16, 18 which are substantially identical to one another except that one jacket half 16 includes an inlet pipe 20 for liquid nitrogen and a vent pipe 22 which allows air to escape when the freeze jacket is charged with liquid nitrogen. Otherwise, the freeze jacket halves are the same and similar reference characters are used in explaining the details of each half of the freeze jacket.

Each freeze jacket half 16, 18 includes an outwardly extending flange 24 with flange mounting holes 26. Pairs of mounting holes register with one another when both halves of the freeze jacket are assembled. Upon assembly the flanges 24 abut one another and nuts and bolts 28 are utilized to releasably secure the two jacket halves together around pipe 12.

It should be noted that each assembled freeze jacket includes a pair of spaced apart supply line sleeves 32 which correspond in size to the outer dimensions of the pipe being serviced. By way of example, if pipe has a 6 inch outer diameter, a freeze jacket is selected having supply line sleeves 30, 32 with a similar 6 inch diameter. Thus, when the freeze jacket halves are assembled around pipe 12 the jacket is securely attached to the pipe and a portion of that pipe is isolated within the freeze jacket, as explained more fully below.

Freeze jacket 10 has an internal cylindrical freeze cavity 34 adjacent the isolated portion of pipe 12, and cavity 34 is constructed and arranged to receive and retain a supply of liquid nitrogen 36. As explained above, inlet pipe 20 in jacket half 16 is used to charge internal freeze cavity 34 with liquid nitrogen, and vent pipe 22 enables air to escape from the cavity as the nitrogen charging process progresses.

Figure 2:
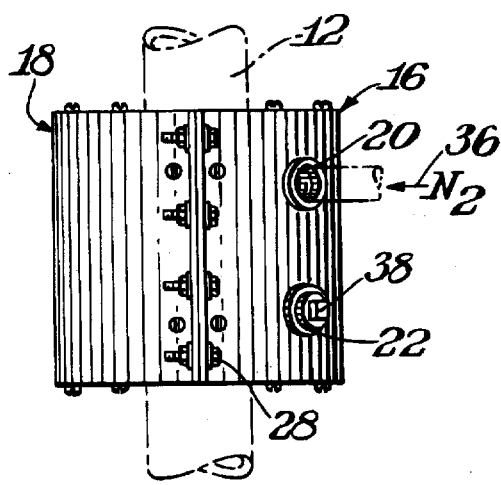
FIG. 2 is a side elevational view of one straight freeze jacket removably surrounding a vertical pipe, according to the present invention.
Figure 4:
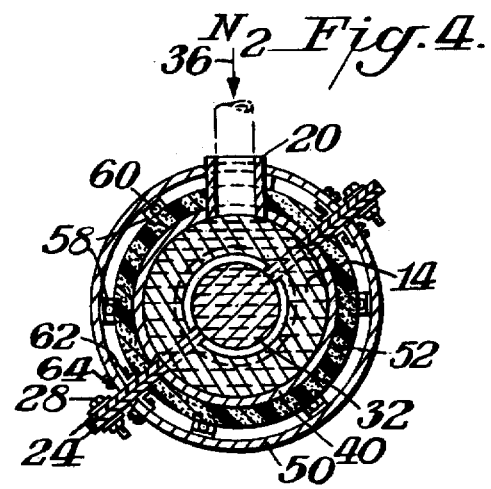
FIG. 4 is a cross-sectional view taken along line 4—4 of FIG. 1.

Normally the freeze jackets of the present invention are utilized on horizontally oriented pipe. However, these jackets may also be used to produce frozen plug 14 in a vertically oriented pipe, such as shown in FIG. 2. Under these circumstances, jacket pipe 22 is sealed with a plug 38 to prevent the liquid nitrogen from escaping. Liquid nitrogen is charged into internal freeze cavity 34 via inlet pipe 20 which simultaneously functions to vent the freeze cavity during the nitrogen charging process.

Cylindrical freeze cavity 34 is primarily defined by a fixed inner two-part cylindrical sleeve 40 with one half of the sleeve associated with each half of the freeze jacket. Cylindrical sleeve halves 40 are secured to the flanges of their respective freeze jacket halves by welding or other techniques known in the art. Opposite ends of each half of cylindrical freeze cavity 34 are closed by suitably shaped semi-annular end walls 42, 44 welded in place between flange 24 and each half sleeve 40.

Each half of freeze jacket 10 has an outer removable cover 50 spaced apart from fixed sleeve 40. Insulation 52 is located on each jacket half on the outside of fixed sleeve 40 between the sleeve and outer removable cover 50. This insulation preferably is non-moisture retentive, and may comprise IMCOA IMCOLOCK polyolefin insulation manufactured by IMCOA, Inc.

Outer cover 50 on each jacket half is removably secured so that removal of the cover exposes insulation 52 for removal and replacement with new insulation. The removable outer cover also permits internal repair of the freeze jacket, such as the repair of welds securing the parts together, for example.

The opposite ends of each jacket half are closed by opposed semi-annular end walls 54, 56 positioned between supply line sleeves 30, 32 and the removable outer cover 50, as shown best in FIG. 8. Each semi-annular end walls 54, 56 is fixedly secured in place by welding these end walls to flange 24 and fixed inner sleeve 40.

Removable outer cover 50 has a plurality of spaced apart L-shaped brackets or tabs 58 at the opposite ends of the cover. These tabs inwardly extend to positions adjacent the opposed semi-annular end walls Fasteners 60 extend through end walls 54, 56 and releasably attach to tabs 58 to thereby releasably secure cover 50 in place. Additionally, upwardly directed L-shaped brackets or tabs 62 are fixed to the flange 24 of each freeze jacket half at positions adjacent the removal cover. Fasteners 64 extend through outer cover 50 and releasably attach to tabs 62 to thereby releasably secure cover 50 in place.

Figure 3:
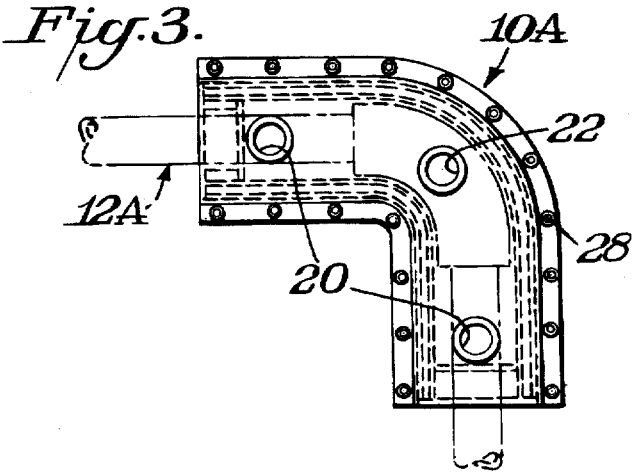
FIG. 3 is a side elevational view of a curved freeze jacket removably surrounding a curved pipe, according to the present invention.
Figure 5:
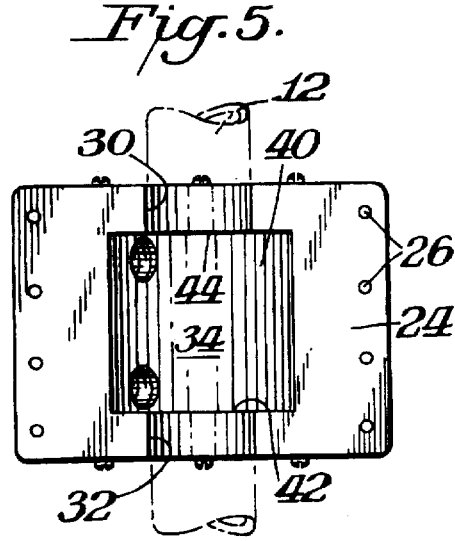
FIG. 5 is a bottom plan view of one half of the freeze jacket shown in FIGS. 1, 2 and 4, according to the present invention, illustrating the internal freeze cavity surrounding a pipe shown in phantom outline.

As generally explained above, a particular freeze jacket 10 is selected depending upon the geometry of the pipe to be surrounded by the jacket. The jacket may have a straight central axis as shown in FIGS. 6-8, for example, surrounding a straight section of pipe 12. Alternatively, a freeze jacket such as 10A illustrated in FIG. 3 may have a curved central axis for surrounding a curved section of pipe 12A. Otherwise, both freeze jacket 10 and 10A function in a similar manner.

Overall, the construction of freeze jacket 10 may be fabricated from aluminum or other metals except for insulation 52. Such construction is durable and long lasting. However, in certain applications such as the servicing of nuclear power plants, freeze jackets 10 have a tendency to become contaminated with radioactive particles. Although the metal parts can easily be decontaminated by appropriate techniques, decontamination of the insulation is difficult, if not impossible. Utilizing the construction of the present invention, insulation 52 easily is removed by first removing outer cover 50. Fasteners 60, 64 are released to enable removal of outer cover 50. The contaminated insulation is then replaced with new insulation and the outer cover is reassembled. The freeze jacket is then free for releasing and further use elsewhere. The contaminated insulation remains behind for proper disposal. However, without the construction of the present invention, decontamination is not possible and further usage of the equipment is lost.

Similarly, removal of the outer cover exposes the internal portions of the freeze jacket which may be in need of repair. Faulty internal welds may then be repaired, for example.

What is claimed is:

1. Apparatus for freezing liquid in a fluid conducting pipe comprising a freeze jacket having two halves for releasably surrounding a section of pipe, each jacket half including outwardly extending flanges in abutting relationship when the jacket halves surround the section of pipe, and means on the flanges for releasably securing the two jacket halves together around the pipe, the freeze jacket having an internal cylindrical freeze cavity adjacent the pipe surrounded by the jacket constructed and arranged to receive and retain a supply of liquid nitrogen, the cylindrical freeze cavity defined in part by a fixed inner two-part cylindrical sleeve, one half of the sleeve associated with each half of the jacket, each half of the freeze jacket having an outer removable cover spaced from the fixed sleeve, insulation on each jacket half positioned between the fixed sleeve and outer removable cover, and means on each jacket half for removably securing the outer cover in place whereby removal of the cover enables internal structural repairs and exposes the insulation for removal and replacement with new insulation.

2. Apparatus for freezing liquid in a fluid conducting pipe as in claim 1 wherein each jacket half includes opposed semi-annular end walls positioned between the fixed inner sleeve and the removable outer cover and extending inwardly to the pipe section, and means fixedly securing the semi-annular end walls to the outwardly extending flange.

3. Apparatus for freezing liquid in a fluid conducting pipe as in claim 2 wherein the means on each jacket half for removably securing each outer cover half in place includes inwardly directed tabs on the cover positioned adjacent the semi-annular end walls and removably fasteners securing the fixed end walls and tabs together.

4. Apparatus for freezing liquid in a fluid conducting pipe as in claim 2 wherein the means of each jacket half for removably securing each outer cover half in place includes upwardly directed tabs on the flange positioned adjacent the removable cover and removable fasteners securing the cover and tabs on the flange together.

5. Apparatus for freezing liquid in a fluid conducting pipe as in claim 4 wherein the means on each jacket half for removably securing each outer cover half in place further includes inwardly directed tabs on the cover positioned adjacent the semi-annular end walls and removably fasteners securing the fixed end walls and tabs on the cover together.

6. Apparatus for freezing liquid in a fluid conducting pipe as in claim 1 including an inlet pipe and a vent pipe on one of the jacket halves, both pipes extending between the internal freeze cavity and the removable cover.

7. Apparatus for freezing liquid in a fluid conducting pipe as in claim 1 wherein the freeze jacket has a straight central axis for surrounding a straight section of pipe.

8. Apparatus for freezing liquid in a fluid conducting pipe as in claim 1 wherein the freeze jacket has a curved central axis for surrounding a curved section of pipe.

* * * * *

UNITED STATES PATENT AND TRADEMARK OFFICE
CERTIFICATE OF CORRECTION

PATENT NO. : 5,680,770
DATED : October 28, 1997
INVENTOR(S) : Richard M. Hall, et. al.

It is certified that error appears in the above-identified patent and that said Letters Patent is hereby corrected as shown below:

Column 3, line 26, after "sleeves" insert -- 30, --.

Column 4, line 15, after "walls" insert -- 54, 56. --

Signed and Sealed this

Thirteenth Day of January, 1998

Attest:

BRUCE LEHMAN

Attesting Officer

Commissioner of Patents and Trademarks